Patented Apr. 22, 1941

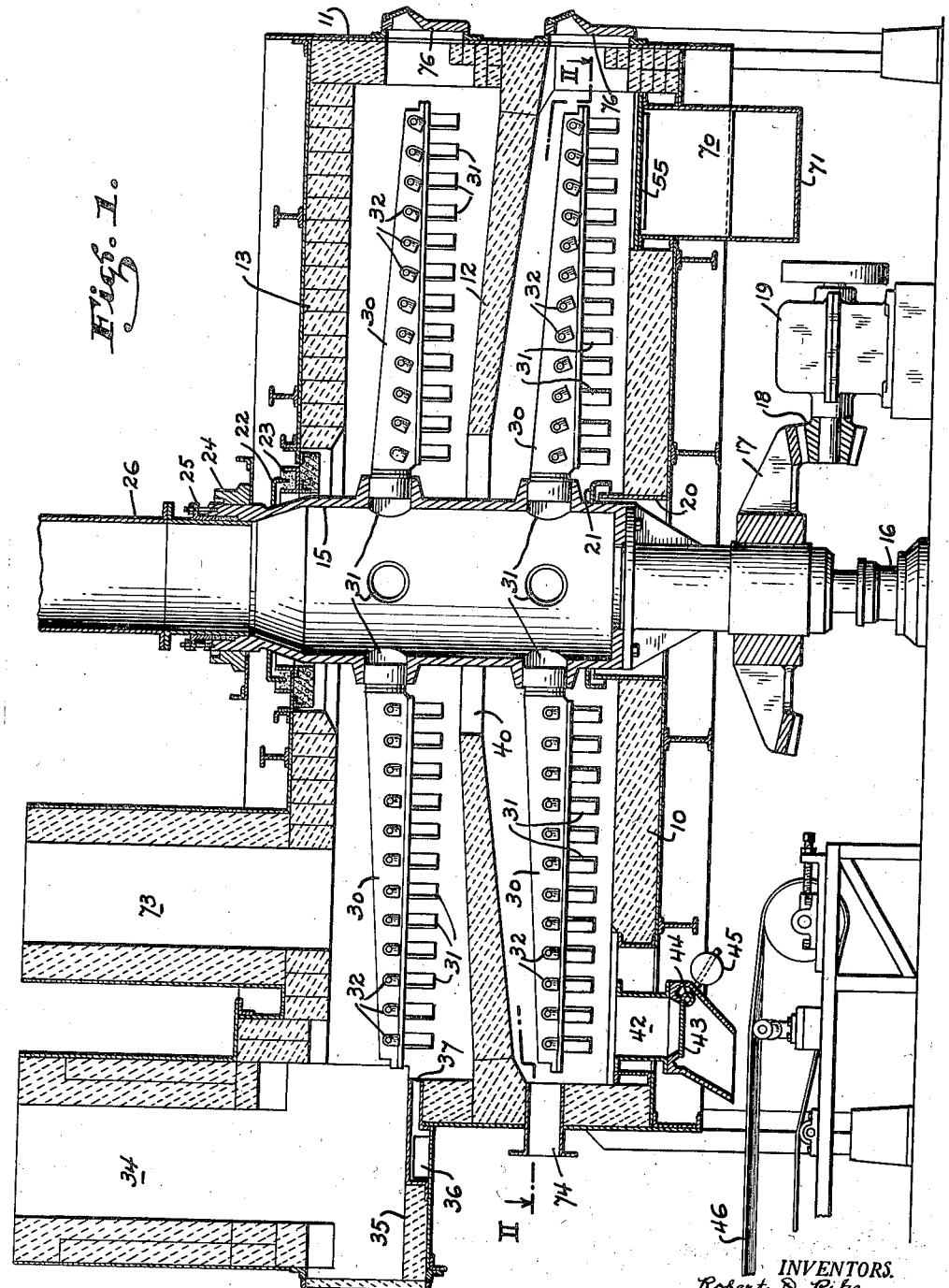

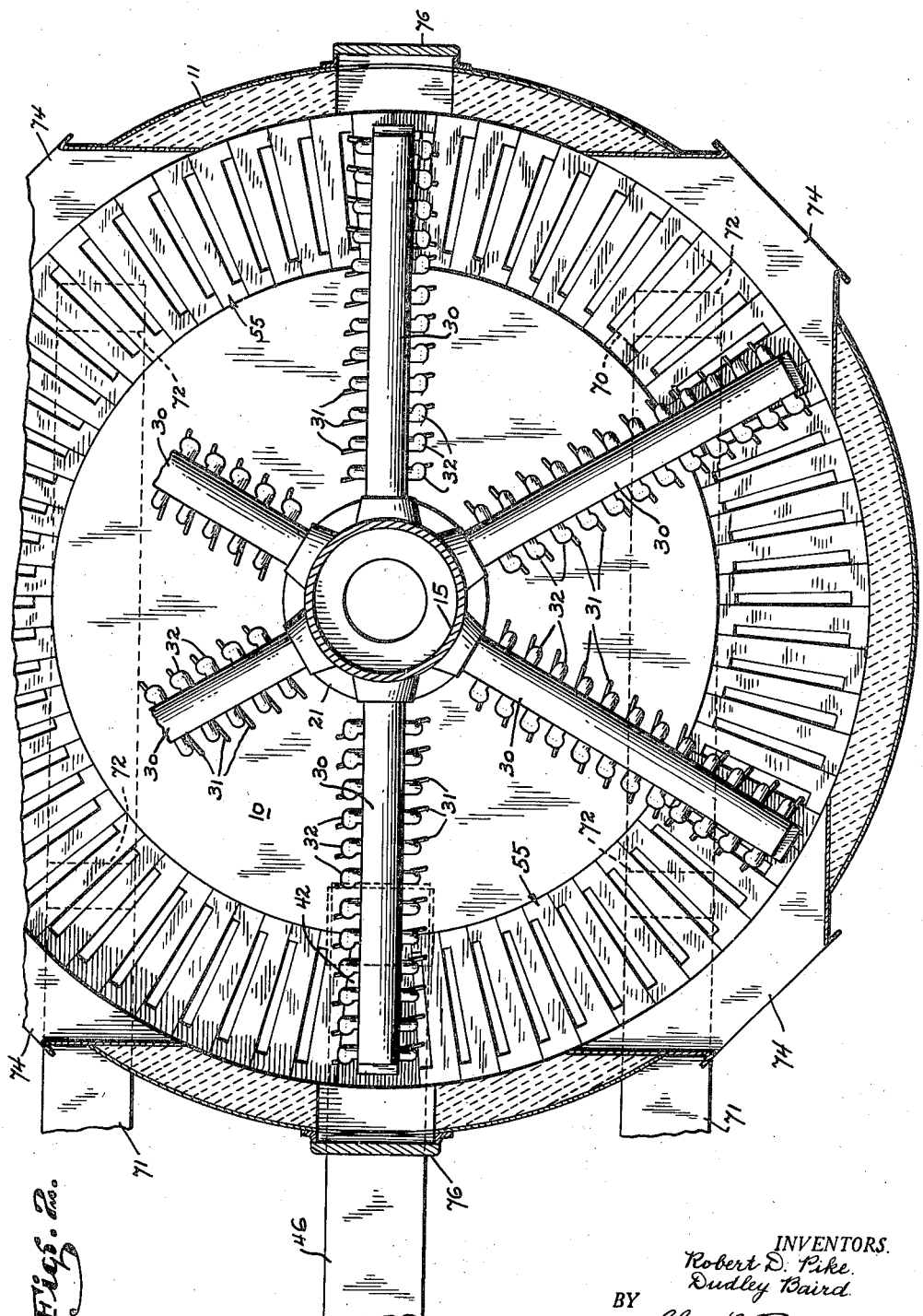

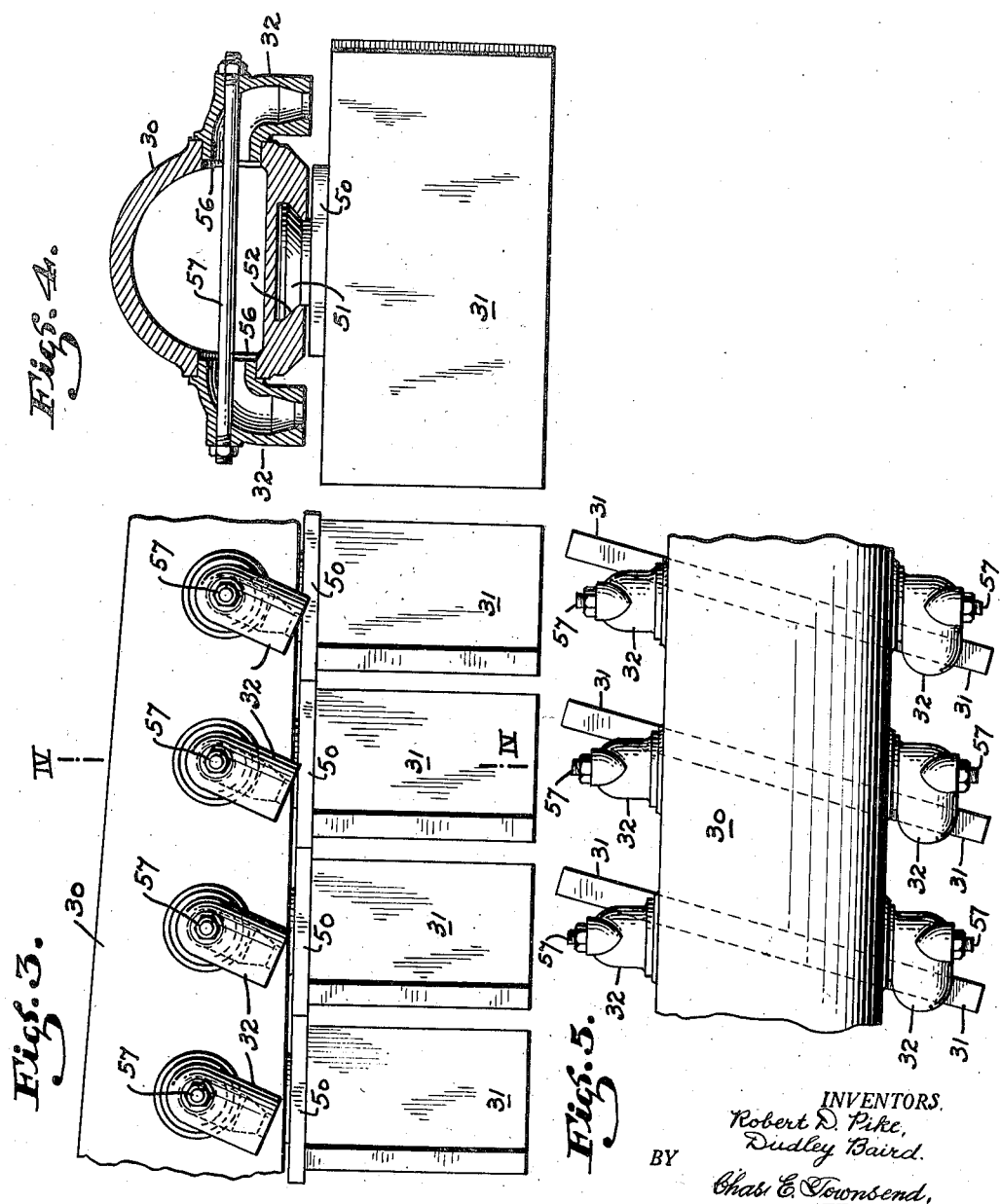

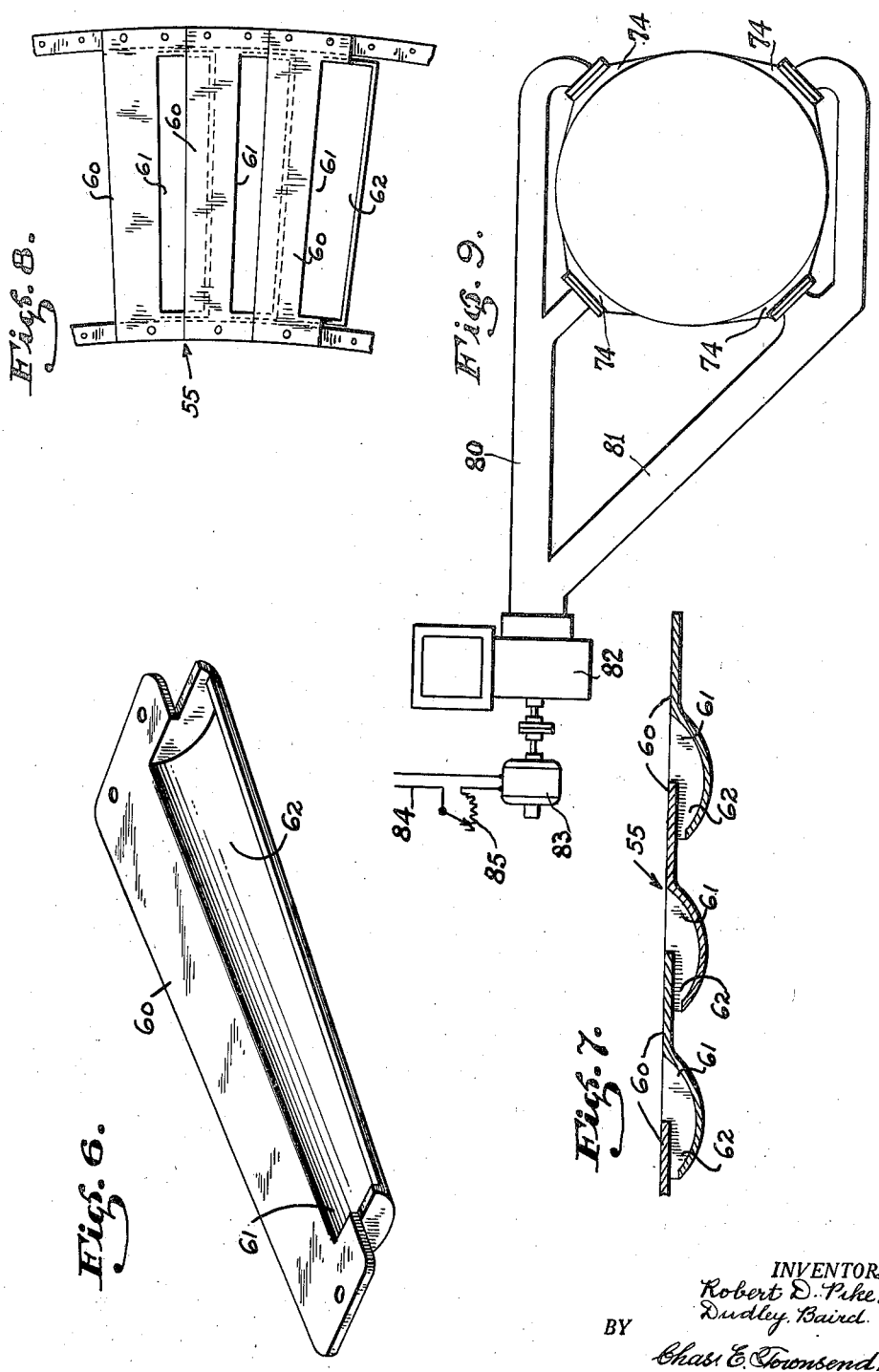

2,239,246

UNITED STATES PATENT OFFICE 2,239,246

COOLER FOR CEMENT CLINKER

Robert D. Pike, Piedmont, and Dudley Baird, Berkeley, Calif.

Application August 15, 1938, Serial No. 224,956

7 Claims. (Cl. 263—26)

The present invention relates to clinker coolers of the general type disclosed in our Patent Number 1,529,808 for "Regenerative clinker cooler," issued March 17, 1925.

It is the function of a clinker cooler of this type to receive clinker from a cement clinker burning kiln at a temperature of about 2500° Fahrenheit or greater, and cool it to about 200° Fahrenheit, at which temperature it may be ground to form cement. Rapid cooling is to be desired in that quickly cooled clinker is more easily ground and produces a better quality of cement than that which is cooled slowly. As large quantities of sensible heat are present in the clinker which is delivered to the cooler, it is desired to preserve as much of this sensible heat as possible by transferring it from the clinker to the air used for cooling it and to utilize this heated air for combustion of fuel in the kiln.

The apparatus described in the patent referred to above is of the kind comprising a vertical cylinder containing upper and lower hearths, over which rabble arms move to rabble the clinker which is deposited upon the hearths, and expose it to a current of cool air conducted through these arms.

The present invention pertains to a cooler of this same general type, and it is the object of the invention to provide in such a cooler means for effecting a highly efficient transfer of heat between the clinker and the air used in cooling it.

A further object is to attain a cooling of clinker by means of directing air onto the clinker in such relation to the travel of rabble teeth therethrough that heat transfer will occur at a rapid rate.

It is a further object of the invention to provide auxiliary cooling means for directing a flow of air upwardly through the clinker while it is being rabbled to supplement the cooling effect of the air passing through the rabble arms.

A still further object is the provision of means for directing hot air from the cooler to the kiln so as to conserve the heat of said air and to provide means for sensitive regulation of the amount of air directed to the kiln, such means also operating to insure that the hottest air from the cooler is directed to the kiln.

Other objects and advantages of the invention which tend toward general efficiency in operation and toward accomplishment of the requirements defined above will be made apparent in the following specification wherein reference is made to the accompanying drawings.

In the drawings—

Fig. 1 is a vertical, sectional view of a clinker cooler embodying our invention.

Fig. 2 is a fragmentary section taken on line II—II of Fig. 1.

Fig. 3 is an enlarged view in elevation of a portion of a rabble arm, illustrating details of the rabble teeth and air nozzles carried by the arm.

Fig. 4 is a sectional view, taken on line IV—IV of Fig. 3.

Fig. 5 is a plan view of a portion of the rabble arm shown in Fig. 3.

Fig. 6 is a perspective view of a grate section which forms a portion of the lower hearth of the cooler.

Fig. 7 is a vertical, transverse, sectional view of three grate sections such as that shown in Fig. 6, illustrating their relative position when assembled.

Fig. 8 is a plan view of three such grate sections in assembled relation.

Fig. 9 is a diagrammatic view in plan of the clinker cooler illustrating the arrangement of exhaust vents and fan associated therewith.

Referring particularly to Figs. 1 and 2 of the drawings, the present invention is illustrated as embodied in a vertically disposed two-hearth clinker cooler. The lower hearth of the cooler is generally indicated at 10 and is surrounded by a wall 11, which wall supports an upper hearth 12 and a roof 13. The main structure is, as illustrated, of refractory material suitably supported and braced by steel plate and structural forms.

A rotatable vertically extending column 15 is disposed concentrically of the cylindrical cooler and is supported at its lower end by a bearing 16 for rotation through suitable gears 17 and 18 by drive means herein illustrated as a motor 19. The column 15 is provided with an air seal where it passes through the lower hearth 10 in the form of a lute ring 20 and lute cap 21 which, under operating conditions, will be embedded in clinker that is being cooled.

An air seal is provided where the column passes through the roof 13 by means of a lute cap 22 cooperating with a sand seal ring 23, into which the downwardly extending flange of the lute ring 22 extends. The uppermost end of the column 15 is guided in a bearing 24 and is connected through a suitable packing joint, generally indicated at 25, with the end of a stationary air duct 26 which communicates with a source of air under pressure not shown, but which may, in accordance with custom, be in the form of a fan or blower.

Hollow rabble arms 30 communicate with the interior of the column 15 through ports 31 and are supported thereby to extend radially outwardly to overlie the upper hearth 12 and the lower hearth 10. The rabble arms 30 support rabble teeth 31 which, upon rotation of the column 15, pass through the beds of clinker disposed upon the hearths 10 and 12, and the arms also carry nozzles, indicated at 32, communicating with the interior of the arms and thus with the interior of the column and the source of supply of air, so that as the column 15 is rotated, the clinker is rabbled by the teeth 31 and cooled by air directed onto it through the nozzles 32. The construction and arrangement of the rabble teeth and the nozzles will be described in detail hereinafter.

A clinker drop 34 receives hot clinker from a kiln (not shown) for introduction to the cooler, and clinker falling through the drop 34 deposits on a shelf 35 from which it may slide or fall into the interior of the cooler and on to the upper hearth 12. An air duct 36, below the shelf 35, communicates with the source of air under pressure by a conduit (not shown) and supplies air to a narrow horizontally extending slit 37 entering through the wall of the cooler and serving the purpose of blowing or fanning the clinker falling from the shelf 35 onto the upper hearth 12, so that an initial cooling of the hot clinker is obtained and so that it is caused to be spread over the surface of the hearth 12 in the path of the rabble teeth passing thereover.

The rabble teeth on the arms 30, which overlie the upper hearth, are disposed at an angle to plow or agitate the clinker and gradually move it inwardly of the hearth as it is subjected to the cool air directed against it through the medium of the nozzles 32. The upper hearth 12 is provided with a central opening 40, through which the column 15 passes, and this opening 40 is considerably larger in diameter than the column so that as the clinker falls through the opening 40 it is deposited on the lower hearth adjacent to the inner ends of the lower rabble arms and in the path of the rabble teeth passing over the lower hearth, these teeth being disposd at an angle to cause gradual movement of the clinker outwardly until it reaches the outer periphery of the lower hearth.

A discharge chute 42 is provided at a point adjacent to the outer periphery of the lower hearth 10, and the cooled clinker falls through this chute onto a sealing trap door 43, hinged, as at 44, and counterbalanced by a weight 45. The construction of this seal is such that the cooled clinker is discharged therefrom at intervals when its weight on the door overcomes that of the balance weight 45. As it is discharged from the chute 42, the clinker is deposited on a conveyor belt 46 by means of which it is carried to a suitable grinding apparatus.

The construction and position of the rabble teeth 31 are best illustrated in Figs. 3, 4 and 5, in which the teeth 31 are shown as vertically disposed plates depending from horizontal plates 50, each of which is provided with a circular undercut head 51, slidably and rotatably fitting within a groove 52 formed in the lower surface of the rabble arm 30. This mounting of the plates permits them to be adjusted to any desired angle, and they may be locked or secured in their adjusted positions by mechanism commonly used for this purpose, which mechanism forms no part of the present invention, and is, therefore, not disclosed herein.

The angularity of the rabble teeth 31 on the rabble arms which overlie the hearth 12 is such that the clinker on said hearth will be first distributed around the outer periphery of the hearth and will then be advanced inwardly as it is rabbled to fall upon the lower hearth 10 near its center. The teeth on the lower rabble arms are disposed at an opposite angle to cause the rabbled clinker to be moved outwardly, with the exception of four or five of the outermost teeth on alternate arms overlying the lower hearth, which teeth are disposed at an angle opposite to the other teeth, as illustrated in Figs. 1 and 2, to retard the outward movement of the clinker and to control its depth during the final rabbling process, and at a time when additional cooling air is supplied through an annular grating, generally indicated at 55 in Fig. 2.

As shown in Figs. 3, 4, and 5, each nozzle 32 comprises an L-shaped fitting, one end of which is adjustably fitted in a port 56 in the side wall of the rabble arm 30, and the other end of which extends in a generally downward direction. The ports 56 may be arranged in opposed pairs so that through-bolts 57 serve each to retain two nozzles in place, or, if desired to obtain a required distribution of air, the nozzles on opposite sides of the arm may be staggered, each being held by a separate bolt similar to the bolts 57.

In practice, it has been found desirable to adjust the angularity of the nozzles so that one directs a stream of air on the leading side of the rabble arm vertically downwardly upon the clinker, while the corresponding nozzle on the trailing side of the arm is adjusted at an angle to cause the air flowing through it to impinge partly upon the rabble teeth and partly upon the clinker as it is agitated or stirred by the teeth. It should be understood, however, that the adjustment of the nozzles may be varied depending upon the position of the teeth and depending upon other operating conditions, so that the air flowing through the nozzles will be used to best advantage for the purpose of cooling clinker and for the additional purpose of maintaining the rabble teeth at a reasonably low temperature.

As a greater supply of cool air is necessary to effect the final cooling of the clinker than is necessary during the initial cooling process, the present invention contemplates supplementing the air which is supplied through the rabble arms with a supply of fresh cool air introduced upwardly toward the outer periphery of the bottom hearth 10 through the medium of the grate 55, the details of construction of which are illustrated in Figs. 6, 7 and 8. This grate is made up of radially extending sectionss, as illustrated in Fig. 6, each of which comprises a grate bar 60, provided with an opening 61 at one edge, underlying which opening is an integrally formed louver 62. The louver 62 extends beyond the edge of the bar to underlie the edge of the adjacent bar, as illustrated in section in Fig. 7, thus to permit upward passage of air but to prevent clinker overlying the grate from escaping downwardly therethrough.

An annular air conduit 70 (see Fig. 1) underlies the grate 55, and cool air, under pressure, is supplied to said conduit to be directed upwardly through the grate and through the clinker overlying the grate by means of ducts 71 (see Figs.

1 and 2) opening into the annular conduit 70 through ports 72.

A hot air exhaust flue 73, opening through the roof of the clinker cooler, serves to exhaust the heated air therefrom and direct it to the kiln where it is utilized as air for combustion. The amount of air used in cooling the clinker, and particularly where additional air is blown through the grate 55 as described above, is greatly in excess of the air required in the kiln. In order, therefore, to provide means for accurately regulating the volume of exhaust air directed to the kiln, and in order to insure that this exhaust air is the hottest air which leaves the clinker cooler, exhaust vents 74 are provided in the side wall of the cooler in communication with the lower hearth chamber. A variable speed suction fan is connected with the vents 74 to withdraw from the cooler all air that is not required in the kiln. In Fig. 9 wherein the clinker cooler is shown diagrammatically in plan view, the vents 74 are shown as communicating with conduits 80 and 81 which join and enter the intake end of a suction fan 82. A motor 83 which drives this fan is energized by a circuit 84 in which is included a variable resistance 85 to vary the speed of the motor and consequently the speed of operation of the fan. This variable speed suction fan, which may be of any standard construction, serves as means for accurately regulating the volume of air passing through the exhaust flue 73, and by reason of the fact that it communicates with the outer zone of the lower chamber rather than with the upper chamber, it draws off the cooler air rather than the air which comes in contact with the hottest clinker being rabbled on the upper hearth. The air withdrawn through the vents 74 is naturally laden with dust and may be cleaned in a conventional cyclone and the dust returned to the belt 46.

Suitable doors for inspection and repairs are arranged, as illustrated at 76, in the wall of the cooler in a position to permit removal of the rabble arms 30 for repair and replacements thereon.

In practice, the very hot clinker which enters the cooler is first subjected to the cool air entering through the slit 37 below the clinker drop and then to the air flowing through the upper rabble arms and directed by the nozzles 32 of said arms against the upper hearth. By the time the clinker falls to the lower hearth, it has given up more than half of its heat to the air which has impinged upon it from the slit 37 and from the nozzles 32 of the upper rabble arms. That is, it has been reduced from a temperature of about 2500° Fahrenheit to a temperature of about 1200° Fahrenheit. When it falls upon the lower hearth, it is further cooled by air flowing through the nozzles associated with the lower rabble arms, and at the time that it reaches the inner edge of the grate, it has been reduced to a temperature of approximately 600° to 800° Fahrenheit. The air which has impinged upon the clinker up to this point is substantially that air which passes upwardly and is utilized for combustion in the kiln.

As the partially cooled clinker is moved over the grate, it is acted upon by air from the four or five pairs of nozzles on the outer ends of the lower rabble arms and also by the air which is blown up through the grate. These two quantities of cool air taken together will in every case be sufficient to cool the clinker to its final temperature ready for discharge from the cooler, which is usually not more than 140° Fahrenheit above atmospheric temperature, but may vary slightly from this in accordance with the quantity of air introduced through the grate and the outer nozzles aforesaid. The temperature of the air which passes through the nozzles of the lower arms and through the grate after it has impinged upon and has passed through the clinker is relatively low because the clinker itself is relatively cool. Ordinarily the temperature of this air will range from 200° Fahrenheit to 250° Fahrenheit. This is the air which is withdrawn through the ports 74, and although there is no means forming a mechanical division between this air and the air which passes upwardly to the kiln, the natural tendency of cold air to remain in the lower part of the cooler will result in the coolest part of the air always passing out through the ports 74. Furthermore, by varying the speed of the suction blower, a sensitive regulation of the amount of hot air flowing to the kiln is obtained at the same time, preventing any unnecessary intermingling of the air from the upper hearth chamber with the air in the lower hearth chamber. This method of regulating the flow of air through the exhaust flue 73 to the kiln also tends to effect a slight negative draft throughout the cooler, thus preventing undesirable blowing out or expelling of hot air and dust.

What we claim is:

1. A clinker cooler comprising vertically spaced hearths, rabble arms rotating over said hearths, means for directing cooling air through said rabble arms onto the clinker on said hearths, a grate at the outer periphery of the lower hearth, and means for directing air upwardly through said grate and through the clinker overlying the grate.

2. A clinker cooler comprising upper and lower hearths, means for delivering hot clinker to the upper hearth and for advancing it inwardly thereover, said upper hearth having a central opening through which the clinker falls to the lower hearth, means for advancing the clinker outwardly over the lower hearth, an air admitting grate surrounding the lower hearth, and means for retarding the outward movement of the clinker overlying said grate.

3. In a clinker cooler having vertically spaced hearths and rabble arms for rabbling clinker disposed on said hearths, adjustable teeth carried by said arms, and a plurality of nozzles adjustably supported by said arms for directing air against the teeth and the clinker.

4. In a clinker cooler of the character described, a hollow rabble arm having rabble teeth depending therefrom to engage with and rabble clinker to be cooled upon movement of the arm, a pair of nozzles for each tooth adjustably supported from opposite sides of the arm adjacent to the tooth, and means for passing cooling air through the arm and said nozzles to impinge on the rabble teeth and the clinker.

5. In a multiple hearth clinker cooler, a rotating central column with an air passage, rabble arms attached thereto with connecting air passages, rabble teeth on said arms, means for directing air jets downwardly from the arms upon the clinker in the vicinity of said teeth, and an annular grate on the outer perimeter of the lowermost hearth for forcing air upwardly through the clinker.

6. In a multiple hearth clinker cooler, a rotating central column with an air passage, rabble arms attached thereto with connecting air passages, rabble teeth on said arms, means for directing air jets downwardly from the arms upon the clinker in the vicinity of said teeth, an annular grate on the outer perimeter of the lowermost hearth for forcing air upwardly through the clinker, means for furnishing air under pressure to the central column and to the grate, and regulatable means for withdrawing surplus air from the outside of the lowermost hearth.

7. In a cooler for clinker or the like a hollow rabble arm, rabble teeth depending therefrom, air nozzles communicating with the interior of the arm to disperse air forced through the arm, and means to adjust the direction of said nozzles to vary the quantity of air impinging on the teeth.

ROBERT D. PIKE.
DUDLEY BAIRD.